United States Patent

Allibhoy et al.

[11] Patent Number: 5,818,440
[45] Date of Patent: Oct. 6, 1998

[54] AUTOMATIC EXECUTION OF APPLICATION ON INTERACTIVE TELEVISION

[75] Inventors: Nizar Allibhoy, Northridge; Joe Edmonds, Los Angeles, both of Calif.

[73] Assignee: Time Warner Entertainment Co. L.P., Stamford, Conn.

[21] Appl. No.: 842,542

[22] Filed: Apr. 15, 1997

[51] Int. Cl.⁶ .............................. H04N 7/10; H04N 7/14
[52] U.S. Cl. .......................... 345/327; 348/10; 348/13; 455/6.2
[58] Field of Search .................... 345/326, 327; 348/6, 7, 9, 10, 11, 12, 13; 455/3.1, 4.1, 4.2, 5.1, 6.1, 6.2; 395/200.47–200.49; H04N 7/10, 7/14, 7/173

[56] References Cited

U.S. PATENT DOCUMENTS

5,563,648  10/1996  Menano et al. ............................ 348/13
5,585,858  12/1996  Harper et al. ......................... 348/13 X

*Primary Examiner*—Mark R. Powell
*Assistant Examiner*—John W. Miller
*Attorney, Agent, or Firm*—Homer L. Knearl; Holland & Hart llp

[57] ABSTRACT

An interactive application on a set top computing is downloaded to the set top computing system from a headend in an interactive television network. The interactive application is automatically executed by the set top computing system currently running a video program for display on a television set connected to the set top. The automatic begins by waiting for an application token embedded in the video program and detecting the application token. In response to the detection of the application token, the video program is terminated and the application downloaded to the set top is captured. The application is then executed in the set top computing system for display on the television set. In addition, a warning token also embedded in the video program is detected. Then in response to detection of the warning token, the downloading of the ITV application to the set top computing system is initiated. The executing step is synchronized with completion of the termination of the running of the video program so that execution of the application begins immediately upon completion of the termination of the video program. The application is executed in the set top computing system, and a current context is stored as an origination reference. When the application is exited, the current context is launched to return the set top operations to the origination reference point from which the application was launched.

23 Claims, 5 Drawing Sheets

AUTOMATIC EXECUTION OF APPLICATION ON INTERACTIVE TELEVISION

BACKGROUND OF THE INVENTION

1. Field of the Invention

This invention relates to execution of interactive programs in a set top computing system for generating displays in a television set. More particularly, the invention relates to initiation of automatic execution of an interactive program in a short-term display as, for example, a commercial advertisement display downloaded to the set top computer system and displayed on the television set.

2. Description of the Related Art

In cable or satellite systems supplying programs to a television set through a set top computing system, the set top computing system provides the capability of interaction between the television viewer and the computing system. Interactive application programs, providing this interactive display on the television set, display menus of alternatives for the television viewer, and the television viewer responds with a remote control to indicate the viewers selections from the menu. Such interactive programming is particularly useful in commercial advertising on television.

An interactive commercial on television would provide the television viewer with a menu when the advertising display commences. For example, if an automobile dealer wished to have an interactive program, the program would download a computer program to the set top computer, the set top computer would display a menu to initiate interaction. The menu might, for example, give the viewer an option to select different displays, or might ask, "Would you like a test drive?" The viewer would respond to these choices with the remote control. By responding, the viewer could select different program displays from the commercial, or could send messages back through the television cabling or satellite system for the dealer. For example, the television viewer could respond positively to the question, "Would you like a test drive?" This information would be passed to the dealer, who would then contact the viewer directly, and provide a car or the demonstration test drive.

The difficulty in implementing this type of interactive program is that the commercial advertising presentation is typically a thirty second byte on television. Accordingly, if the interactive nature of the commercial presentation commences in the last portion, say twenty seconds into the presentation, by the time the viewer reaches for the remote control to respond, the display is finished and the viewer has not had sufficient time to respond. To date, interactive programming in commercial advertising has been indicated by a an icon at the beginning of the commercial. Thus, there is no interactive display and the viewer must recognize the icon, find the television remote control and respond to the icon with the remote control to indicate that the viewer wishes to see the interactive menu. In a thirty second commercial presentation, the presentation may complete before the viewer has been able to respond. Alternatively, if the viewer responds late in the presentation, the display menu may appear and quickly disappear at the end of the presentation. Again, before the viewer has made a selection from the displayed menu.

Another problem with using an icon to prompt the user to initiate the interactive program, is the user may not recognize that an interactive presentation is available. The interactive presentation to be initiated requests the user to select a special button on the remote control. If the viewer is not expecting, or knowledgeable as to the context of the interactive icon, the viewer will not make the selection on the remote control to initiate the interactive presentation.

SUMMARY OF INVENTION

In accordance with this invention, the above problems have been solved by automatically executing an interactive application on a set top computing system. The application is downloaded to the set top computing system over a distribution network. A video program received over the network by the set top computing system runs on a television set connected to the set top computing system. The automatic execution of the interactive application is accomplished through computer implemented steps and begins by waiting for an application token embedded in the video program and detecting the application token. In response to the detection of the application token, the video program is terminated, and the interactive application program being downloaded to the set top is captured. The interactive application program is then executed in the set top computing system for display on the television set.

As another feature of the invention, additional steps are performed prior to the detection of the application token. A warning token embedded in the video program is detected. Then in response to detection of the warning token, the downloading of the application to the set top computing system is initiated. The executing step is synchroned with completion of the termination of the running of the video program by the terminating step so that execution of the application begins immediately upon completion of the termination of the video program.

As another feature of the invention the executing step further comprises the following additional steps. First, a plurality of choices are displayed on the television set to a user of the set top computing system. A selected application in response to a choice by the user is launched. The selected application is executed in the set top computing system, and a current context is stored as an origination reference for the selected application. The selected application interacts with the user until a quit response from the user is detected. In response to a quit response, the current context stored by said storing step is launched to return the set top operations to the origination reference point from which the selected application was launched.

As another feature of the invention the launching step comprises the following steps. First, the current context is detected to determine whether a television channel number or an application name is the current context. In response to detecting a channel number, the set top tunes to the channel number for display of that channel at the television set. In response detecting an application name, an application identified by the application name is executed by the set top.

The above computer implemented steps in another implementation of the invention are provided as an article of manufacture, i.e. a computer storage medium or a computer transmission medium containing a computer program of instructions enabling a computer to perform a computer process having the above described steps.

In an machine implementation of the invention apparatus automatically executes an interactive application in a set top computing system, where the application is downloaded to the set top computing system from a media asset or interactive television network connected to the set top computing system. The set top computing system processes a current media application to perform the current application on a multimedia display device connected to the set top computing system. The automatic execution of the interactive application begins at a detector detecting a media switch signal embedded in the current media application. The media switch signal indicates receipt of the interactive application from the media asset network. A switching module, responsive to detection of the media switch signal by said detector, terminates processing by the set top computing system of the current application being performed on the multimedia display device and initiates processing of the interactive application on the set top computing system so that the interactive application is performed on the multimedia display device.

As a further feature of the invention the switching module further comprises a termination module, a capture module, an execute module and a synchronizer. The termination module responds to detection of the media switch signal and terminates processing of the current application. The capture module captures the interactive application as it is downloaded from the media asset network with the current application. The execute module processes the captured interactive application on the set top computing system. The synchronizer synchronizes initiation of processing by said execute module in response to termination of processing of the current application.

In another feature of the invention, the execute module includes the following apparatus. First, a storage device stores a current context record identifying the current application. A quit detection module tests whether a user's response to the interactive application is a quit command and generates a quit signal if the user's response is a quit command. A close module, responsive to the quit signal, closes the processing of the interactive application and returns the set top computing system to the current application identified by the current context record stored in said storage device. The close module has a quit module terminating the processing of the interactive application by the set top computing system and a launch context module retrieving the current context record from the storage device and reinitiating the current application at the set top computing system. The current context record for the current application includes a video channel number or an application name, and the launch context module has a channel detector, a tuner and an execute module for the current application. The channel detector detects whether the current context record identifies a video channel or a multimedia application. The tuner, responds to detection of a video channel by said channel detector and tunes the display for the multimedia display device to the video channel. The current application execute module, responds to detection of a multimedia application and resumes processing of the current application by the set top computing system from where the current application was terminated by said termination module.

The great advantage and utility of the present invention is that the interactive program will commence automatically and requires no actin by the viewer. The foregoing and other features, utilities and advantages of the invention will be apparent from the following more particular description of a preferred embodiment of the invention as illustrated in the accompany drawings.

DESCRIPTION OF THE PREFERRED EMBODIMENTS

The embodiments of the invention described herein are implemented as logical operations in an interactive television network system having a headend and set top computing systems. The logical operations of the present invention are implemented (1) as a sequence of computer implemented steps running on the set top computing system or (2) as interconnected machine modules within the set top computing system. The implementation is a matter of choice dependent on the performance requirements of the set top computing system implementing the invention. Accordingly, the logical operations making up the embodiments of the invention described herein are referred to variously as operations, steps or modules.

Figure 1:
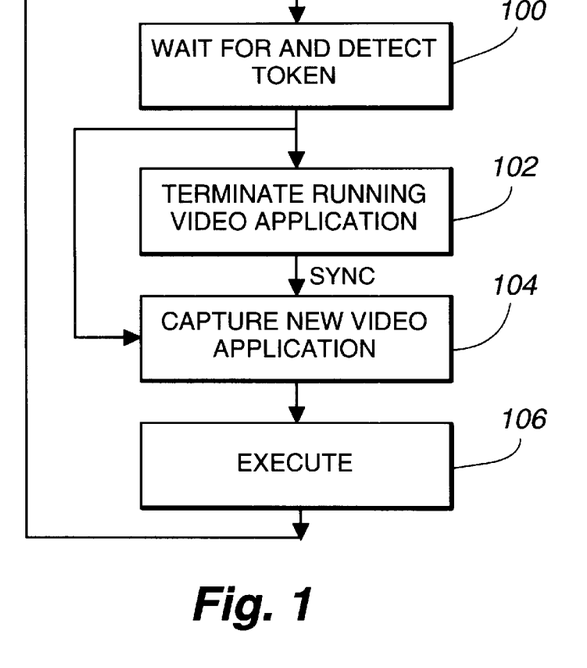
FIG. 1 illustrates operative modules making up a preferred embodiment of the invention.

In its simplest form, the preferred embodiment of the invention is illustrated in the operative modules in FIG. 1. Detect token module 100 is waiting for an application token which is imbedded in the video presentation being displayed. When detection module 100 detects the application token, it generates a token present signal. Terminate module 102 in response to the token present signal, terminates the running of the present video application and, at the same time, capture module 104 captures the new video presentation to be run. The video application to be run is captured and run in real time. Thus, the execution of a new video application proceeds immediately upon the capture of the first video frame of the new video application. Execute module 106 thus executes the new video presentation trigger by the detection of the token. When the new video application is completed, or terminated by the viewer, the execute module 106 returns the previous video presentation that was terminated to the active state for presentation on the television set by the set top computing system. The operation flow then returns from the execute module 106 to the wait and detect token module 100 to look for the next token indicating the automatic execution of a new video presentation.

Figure 2A:
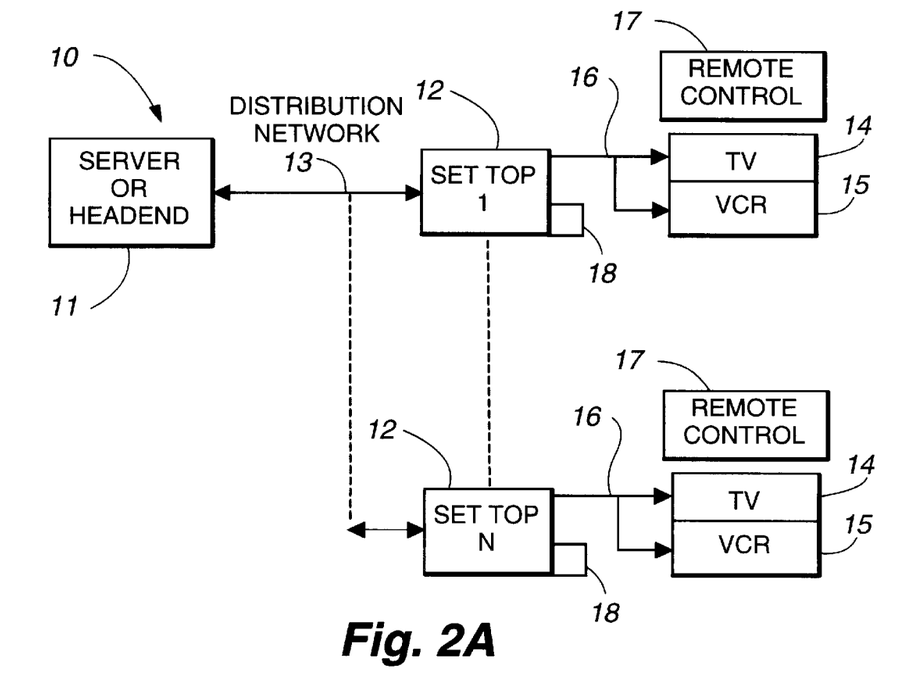
FIG. 2A shows an interactive television cable network in which the preferred embodiment of the invention may be used.

FIG. 2A shows an Interactive TV (ITV) network 10 having a headend or server 11 and a number N of individual set-tops (set top computing systems) 12. This ITV network is of a very general and simplified form wherein headend 11 provides both broadcast and interactive viewing services to the N subscribers or users that are within network 10.

While it is possible that any individual user could have more than one set-top 12 installed at the user's physical location or home, FIG. 1 assumes that each user has only one set-top connected to the system's headend 11 by way of a two-way analog/digital distribution network 13. Each set-top 12 has one TV set 14 and one VCR 15 connected to that user's set-top. As is well known, each set-top 12 operates to connect one headend channel to TV 14 and/or VCR 15. For example, any given set-top 12 may operate to connect the headend's channel 5 to both its TV 14 and its VCR 15 by way of a cable 16 As is conventional, a set-top 12 transmits all system channels by way of a channel-3 or channel-4 output on cable 16, and all TVs 14 and VCRs 15 are constructed and arranged to receive on channel-3 or on channel-4. In addition, each of the N users is provided with a manually operable infra-red (IR) remote control(s) 17 that enables a user to communicate with that user's set top 12 and with that user's VCR 15.

As stated above, channel picture signals, as well as other visual data, that is to be visually presented to a user on the screen of a TV 14, and/or that is to be recorded by operation of a VCR 15, is contained on the output connection or cable 16 that is connected as the output of each set-top 12. In addition, each set-top 12 is provided with an IR control unit 18, or VCR blaster 18, by which a set-top automatically controls the various functions of its associated VCR 15.

The present invention relates to apparatus/logic/methods that are structurally and functionally resident within set-tops 12 and headend 11 of network 10. All of the FIG. 2A set-tops 12 are of generally the same construction and arrangement, and FIG. 2B shows one of the set-tops in greater detail.

Figure 2B:
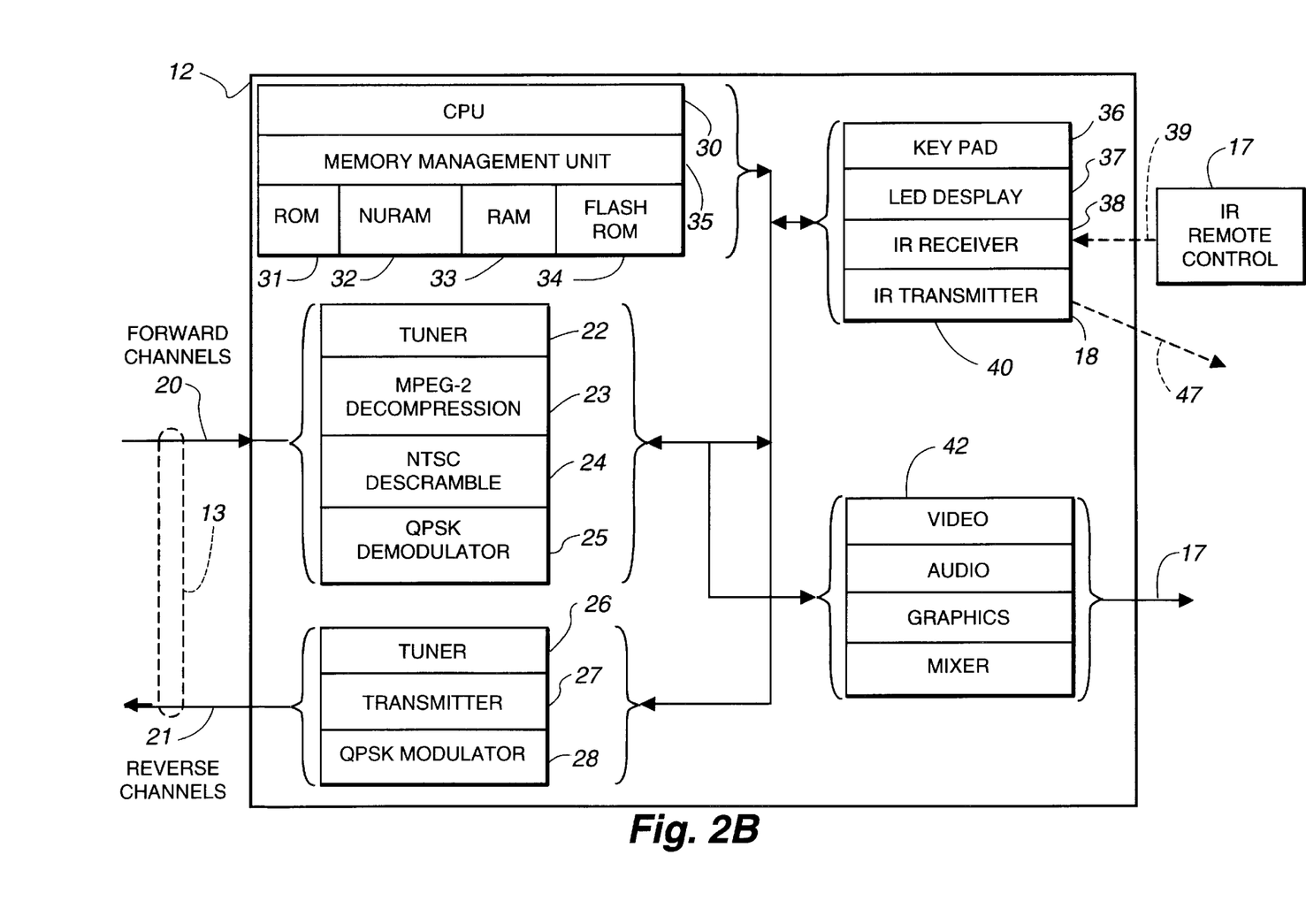
FIG. 2B shows the set-tops of FIG. 2A in detail.

In FIG. 2B, the input to the set-top 12 comprises FIG-1s distribution network 13. Distribution network 13 is made up of a number of forward channels 20 and a number of reverse channels 21. Forward channels 20 comprise the channels whereby headend 11 communicates with each of the set-tops 12, whereas reverse channels 21 comprise the channels whereby a set-top communicates with headend 11. Forward channels 20 provide input to a tuner 22, a MPEG-2 decompression unit 23 (Motion Picture Experts Group ISO standard for the compression of video and audio), an NTSC (National Television Standards Committee) descrambler 24, and a QPSK (Quadrate Phase Shift Key) demodulator 25. Reverse channels 21 receive input from a tuner 26, a transmitter 27, and a QSPK modulator 28.

Operation of set top 12 is controlled by the operation of a central processor unit (CPU) 30. In a manner well known to those of skill in the art, memory elements 31–34 contain data, applications and control programs that enable CPU 30 to perform any of a number of desired control scenarios for the set top. A memory management unit 35 is also provided.

Each set top 12 also includes a user-operable keypad or keyboard 36, an LED display 37, an IR receiver 38 that operates to receive IR transmissions 39 from the user's remote control 17 (FIG. 2A), and an IR transmitter 40 that comprises VCR blaster 18 (FIG. 2A) whereby a VCR 15 is controlled by an IR beam output 41.

The set top's cable output 16 that is connected to a TV set 14 and to a VCR 15 receives its inputs from a video/audio/graphics storage arrangement 42. Storage arrangement 42 also includes a mixer whereby user-alert messages that are generated under the control of CPU 30 may be momentarily placed over a portion of a scene that the user is currently viewing on the screen of TV set 14.

Forward channels 20 may include both forward application channels and forward data channels. One use of forward application channels 20 is supplying data, messages and control instructions to a set-top during vertical blanking intervals (VBI) of a picture signal that is being transmitted to a set-top. One example of a control instruction is an authorizations signal that enables a given user to view pay-for-view features. Forward channels 20 provide a high data rate, for example from 27 to 36 megabits per second, whereas reverse channels 21 are relatively low data rate channels, for example 1.5 megabits per second.

Figure 3:
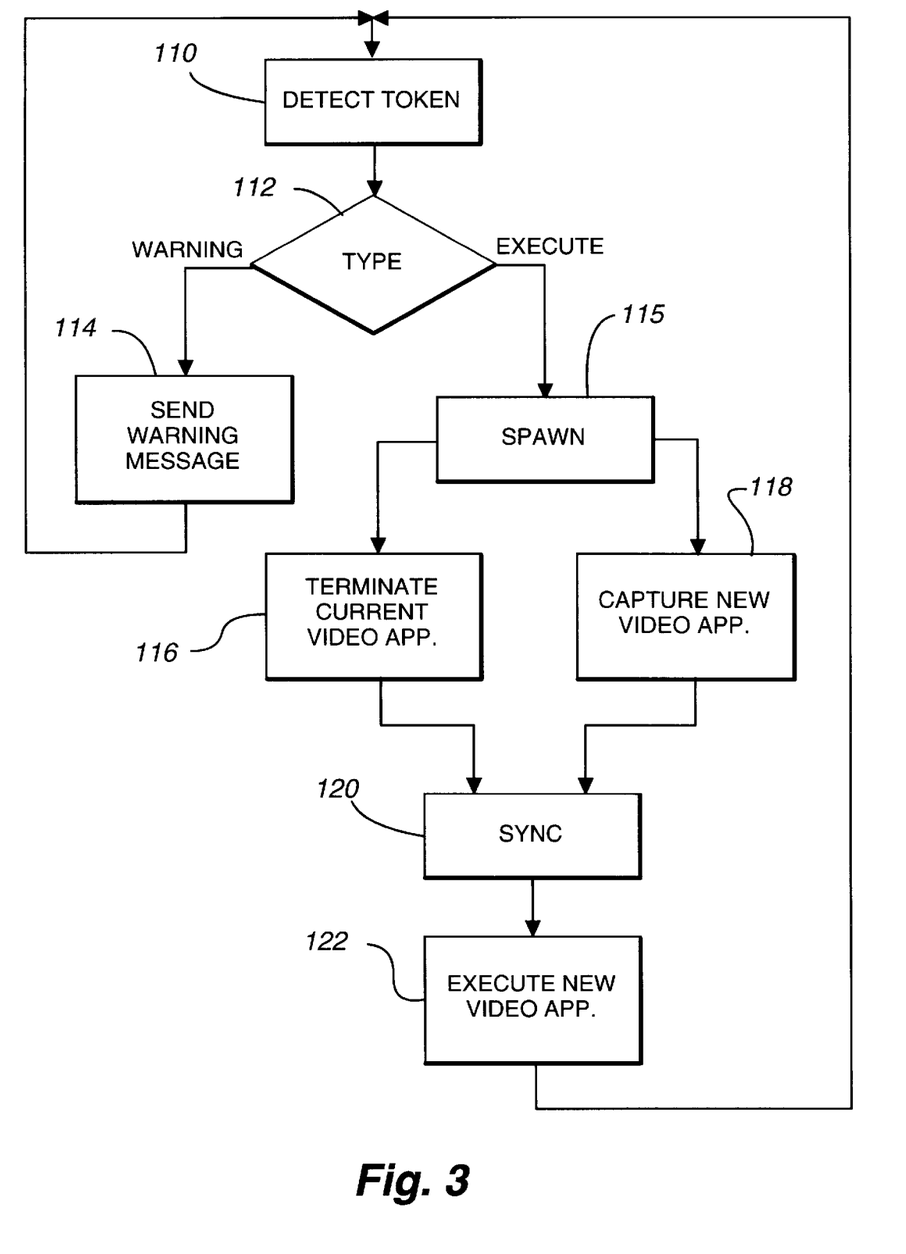
FIG. 3 illustrates a preferred embodiment of the invention that makes use of a warning token as well as an execute token in the automatic execution of an application.

FIG. 3 illustrates a preferred embodiment of the invention that makes use of a warning token as well as an execute token. Detect token module 110 is waiting and looking for a token in the video stream. In this case, there are two types of tokens that may be detected. A first token referred to as a warning token is a flag to indicate that a execute token will be shortly received. A warning token might be at the tail end of a previous presentation or currently running application or it might be at the beginning of the new application. For example, if the current presentation was a television program, the warning token might be an indication that a commercial was about to begin and further that the commercial would contain an automatic execute token. Alternatively, the warning token could be at the very beginning of the commercial presentation to indicate to the set top that this commercial presentation contains an automatic execute token. In either event, after the token is detected, decision operation 112 detects whether the token was a warning token or an execute token. If the token was a warning token, operation 114 then sends a warning message to the set top computing system to initialize itself to a state where it is ready for an execute token. After the warning message goes out to the set top computing system, the operation flow returns to the detect token module 110.

When the detect token module detects the execute token, decision operation 112 will branch the operation flow to spawn operation 115. Spawn operation 115 initiates two parallel operation flows. In a first operation flow, the terminate module 116 terminates the current video application running on the set top computing system and being presented to the viewer through the television set. In the second operation flow, capture operation 118 captures the new video application which is to replace the terminated current video application. The new video application captured in operation 118 passes through a sync operation 120 to an execute operation 122. The sync operation 120 does not pass a new video application to the execute operation until it detects completion of the termination operation 116. In this way, the new video presentation will begin immediately upon termination of the current video presentation.

Execute operation 122 has two primary functions. First, it executes on the set top computing system the new video application for presentation on the television set to the viewer. Second, it remembers the location and, optionally, the state of operation of the current video application so that when the new video application is completed, the set top computing system may be returned to the current video application terminated in operation 116. After the new video application has been executed and presented, and the current video application has been reinitiated by the execute operation 122, the operation flow returns to detect token module 110. The system is then ready to process the next automatic execution of a new video application.

Figure 4:
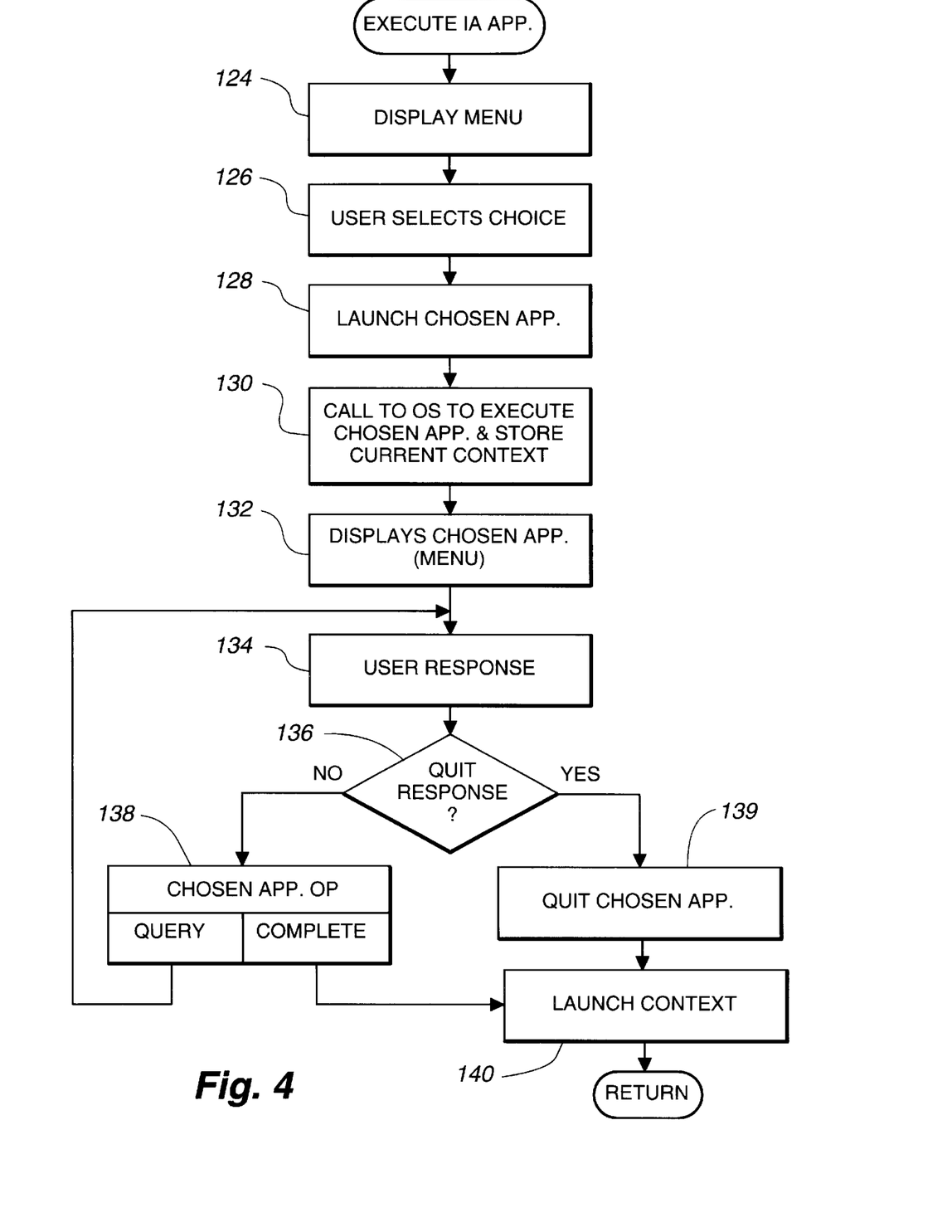
FIG. 4 shows the details of execute module 122 in FIG. 3.

The execute operation or module 122 is shown in FIG. 4. The execute module begins at display menu operation 124. This display operation displays to the viewer, or user, multiple choices from which the user may select. In operation 126, the user making use of the remote control for the television set selects a choice from the menu displayed by operation 124. From the choice selected by the viewer, the execute module launches the selected application in operation 128. In response to the launching of the selected application, call and store operation 130, proceeds to call the operating system in the set top computing system to execute the selected application. Operation 130 also stores the current context from which the selected application was chosen by the viewer. The current context would be the application displaying the menu for operation 124. The current context would identify a current application, or it might identify a channel number or it might identify both, where a television program on a given channel has been overlaid by an application program, such as a commercial. Once the selected application begins to run, operation 132 displays to the user the selected application presentation which may, or may not be, another menu.

In response operation 134, the user or viewer responds to the selected application again using the remote control provided with the set top computing system. Decision operation 136 detects whether the user's response is a quit command for the selected application. If it is not a quit command, then the operation flow branches to operation 138 which continues the display of the selected application. The selected application may prompt the user with queries or may simply run until it completes. If the selected application queries the user, then another user response will be generated at step 134. If the selected operation just runs to completion, the operation flow proceeds to the launch context module 140.

The launch context module 140 is also reached through the user initiating a quit response. If a quit response is detected by decision operation 136, then operation 139 quits, or terminates, the selected application. In either event, after the selected application completes, or is terminated by the user, launch context operation begins. In the launch context module or operation, the set top computing system is returned to the same state that it was in as specified in the stored current context information.

The current context information was stored in operation 130. Accordingly, if the current context indicates a previous application at a specific channel number, the set top computing system returns the viewer to that application at that channel number. If the current context simply indicates a channel number, then the viewer would be returned to the television program on that channel. The television program would be displayed at whatever current presentation it is making. Television program material, if any, which had been displayed while the user was viewing the selected application would be lost to the viewer. On the other hand, an application presentation interrupted by the viewer to go to a selected application would return to the same state and the viewer would lose nothing of that application presentation.

Figure 5:
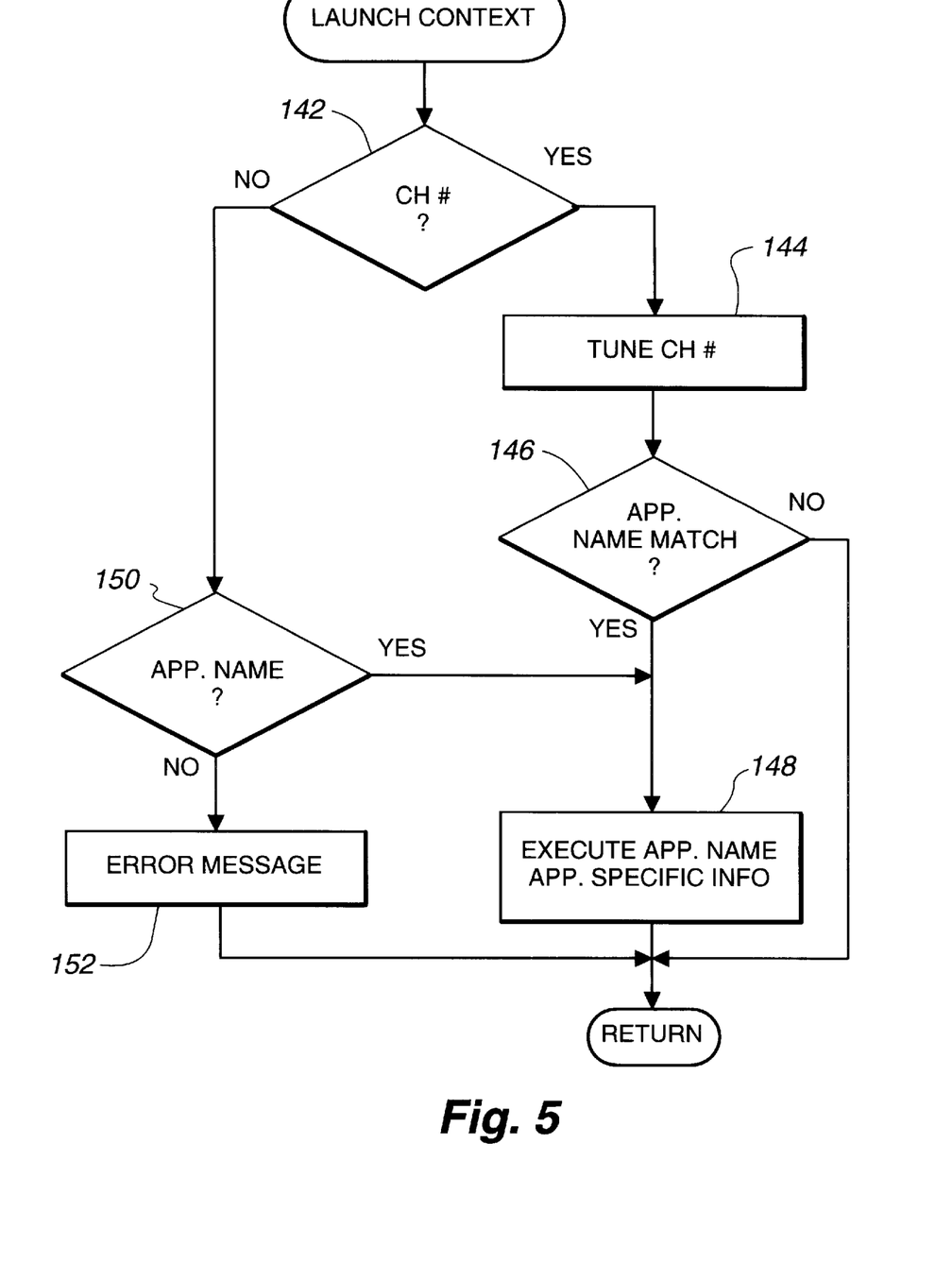
FIG. 5 shows the details of the launch context module 140 in FIG. 4.

The launch context module is illustrated in FIG. 5. As mentioned above, the current context contains the following information: Channel number, application name, and application specific information. The channel number is the television channel over which a television program is being received at the computer set top for display on the television set. The application name would be the identifier for the interactive application downloaded through forward cables to the computer set top computing system. Application specific information would be control information that related to the application named by the application name. For example, the application specific information might specify the reentry point into the application after the viewer has quit using a selected application selected from the application identified by the application name.

The launch context operations begin at decision operation 142. Decision operation 142 tests for whether the current context contains a channel number. If it does contain a channel number, the operation flow branches to operation 144 where the set top computing system tunes to the channel number and passes that television program on to the television set. Decision operation 146 then tests for an application name match between the current context and an application that may be running at that time on the channel just tuned to in operation 144. If there is no application name in the current context or if another application is running on the channel, the operation flow branches "No" from decision operation 146. In such a situation, set top continues to display the television program being received over the channel. If decision operation 146 does detect an application name match, then the operation flow branches "Yes" to execute the application named by the application name. This execution is performed by execution operation 148. Operation 148 also receives the applications specific information contained in the current context and executes any controls for the application as specified by that applications specific information. In a specific example where a viewer has chosen a selected application from a commercial application and the selected application has been completed, or quit by the viewer, the current context would contain the channel number and the commercial application name and the application specific information indicating where to return to in the commercial application. In this synerio, channel number would be detected in decision operation 142, the tuner in the set top would tune to the channel number in operation 144. If the commercial application was still present, then the application name match 146 would branch the operation flow to the execution operation 148 to resume the commercial application at the point where the selected application left the commercial application. On the other hand, if the commercial application was not longer present over the channel, then the viewer would simply return to the program being displayed over the channel.

The current context may not contain a channel number. In a situation where the application does not overlay a television program on a channel, the current context might just indicate a return to the application identified by the application name. In such an event, decision operation 142 in FIG. 5, would branch "No" to decision operation 150. Decision operation 150 would detect the application name. If the application name is detected, the operation flow branches "Yes" to the execute operation 148. Execute operation 148 then executes the application identified by the application name using any application specific information provided with the current context. If decision operation 150 does not detect an application name in the current context, there is an error. The current context must have either a channel name or an application name, or it may have both. If neither the channel number or the application name are present, then an error has occurred in the system. Accordingly, operation flow branches to the error message operation 152 to send an error message to the set top computing system. The error message would likely trigger an error message to the viewer or possibly just execute a default operation such as selecting a channel for display on the television set.

While the invention has been particularly shown and described with reference to preferred embodiments thereof, it will be understood by those skilled in the art that various other changes in the form and details may be made therein without departing from the spirit and scope of the invention.

What is claimed is:

1. A method for automatic execution of an application by a set top computing system where the application is downloaded to the set top computing system from a television distribution network, the set top computing system displaying a video program on a television set connected to the set top computing system, said method comprising the steps of:

waiting for an application token embedded in the video program and detecting the application token;

in response to the detection of the application token, terminating the running of the video program and capturing the application downloaded to the set top; and executing the application in the set top to display the application on the television set.

2. The method of claim 1 and in addition prior to the detection of the application token the steps of:
   detecting a warning token embedded in the video program; and
   in response to detection of the warning token, initiating the downloading of the application to the set top computing system.

3. The method of claim 2 and in addition the step of:
   synchronizing said executing step with completion of the termination of the running of the video program by the terminating step so that execution of the application begins immediately upon completion of the termination of the video program.

4. The method of claim 1 and in addition the step of: synchronizing said executing step with completion of the termination of the running of the video program by the terminating step so that execution of the application begins immediately upon completion of the termination of the video program.

5. The method of claim 1 wherein said executing step further comprises the steps of:
   displaying on the television set a plurality of choices to a user of the set top computing system;
   launching an application in response to a choice by the user;
   executing the application in the set top computing system and storing a current context as an origination reference for the application;
   interacting the application with the user;
   detecting a quit response from the user; and
   in response to a quit response, launching the current context stored by said storing step to return the set top operations to the origination reference point from which the application was launched.

6. The method of claim 5 wherein said launching step comprises the steps of:
   context detecting whether the current context is a television channel number or an application name;
   in response to said context detecting step detecting a channel number, tuning the television set to the channel number; and
   in response to said context detecting step detecting an application name, executing an application identified by the application name.

7. Set top apparatus for automatic execution of an interactive application in a set top computing system where the application is downloaded to the set top computing system from a media asset network connected to the set top computing system, said set top computing system processing a current media application to perform the current application on a multimedia display device connected to the set top computing system, said apparatus comprising:
   a detector detecting a media switch signal embedded in the current application, the media switch signal indicating receipt of the interactive application from the media asset network; and
   a switching module, responsive to detection of the media switch signal by said detector, terminating processing by the set top computing system of the current application being performed on the multimedia display device and initiating processing of the interactive application on the set top computing system so that the interactive application is performed on the multimedia display device.

8. The set top apparatus of claim 7 wherein said switching module further comprises:
   a termination module, responsive to detection of the media switch signal, terminating processing of the current application;
   a capture module capturing the interactive application as it is downloaded from the media asset network with the current application;
   an execute module processing the interactive application on the set top computing system; and
   a synchronizer synchronizing initiation of said execute module in response to termination of processing of the current application.

9. The set top apparatus of claim 8 wherein said execute module further comprises:
   a storage device storing a current context record identifying the current application;
   a quit detection module testing whether a user's response to the interactive application is a quit command and generating a quit signal if the user's response is a quit command; and
   a close module, responsive to the quit signal, closing the processing of the interactive application and returning the set top computing system to the current application identified by the current context record stored in said storage device.

10. The set top apparatus of claim 9 wherein said close module further comprises:
    a quit module terminating the processing of the interactive application by the set top computing system; and
    a launch context module retrieving the current context record from said storage device and reinitiating the current application at the set top computing system.

11. The set top apparatus of claim 10 wherein the current context record for the current application includes a video channel number or an application name and said launch context module further comprises:
    a channel detector detecting whether the current context record identifies a video channel or a multimedia application;
    a tuner, responsive to detection of a video channel by said channel detector, tuning the multimedia display device to the video channel;
    a current application execute module, responsive to detection of a multimedia application, resuming processing of the current application by the set top computing system from where the current application was terminated by said termination module.

12. A computer program storage medium readable by a computing system and encoding a computer program of instructions for executing a computer process for automatic execution of an application by a set top computing system where the application is downloaded to the set top computing system via a video program being displayed on a television set connected to the set top computing system, said computer process comprising the steps of:
    waiting for an application token embedded in the video program and detecting the application token;
    in response to the detection of the application token, terminating the running of the video program and capturing the application downloaded to the set top; and
    executing the application in the set top to display the application on the television set.

13. The computer program storage medium of claim 12 where the computer process prior to the step of detecting the application token further comprises the steps of:

detecting a warning token embedded in the video program; and     in response to detection of the warning token, initiating the downloading of the application to the set top computing system.

14. The computer program storage medium of claim 13 where said computer process in the computer program further comprises the step of:

synchronizing said executing step with completion of the termination of the running of the video program by the terminating step so that execution of     the application begins immediately upon completion of the termination of the video program.

15. The computer program storage medium of claim 12 where said computer process in the computer program further comprises the step of:

synchronizing said executing step with completion of the termination of the running of the video program by the terminating step so that execution of the application begins immediately upon completion of the termination of the video program.

16. The computer program storage medium of claim 12 where, in the computer program, the computer process step of executing further comprises the steps of:

displaying on the television set a plurality of choices to a user of the set top computing system;

launching an application in response to a choice by the user;

executing the application in the set top computing system and storing a current context as an origination reference for the application;

interacting the application with the user;

detecting a quit response from the user; and in response to a quit response, launching the current context stored by said storing step to return the set top operations to the origination reference point from which the application was launched.

17. The computer program storage medium of claim 16 where, in the computer program, the computer process step of launching comprises the steps of:

context detecting whether the current context includes one or more of a television channel number and an application name;

in response to said context detecting step detecting a channel number, tuning to a channel identified by the channel number; and     in response to said context detecting step detecting an application name, executing an application identified by the application name.

18. A computer program transmission medium in an interactive television network storing a computer program being downloaded to and readable by a set top computing system, said computer program transmission medium encoding a computer program of instructions for executing a computer process for automatic execution of an interactive television (ITV) application by a set top computing system where the ITV application is also downloaded to the set top computing system via an ITV signal transmitted over the interactive television network; said computer process comprising the steps of:

waiting for an application token in the ITV application and detecting the application token;

in response to the detection of the application token, terminating the running of a current video program and capturing the ITV application downloaded to the set top; and     executing the ITV application in the set top to display the application on the television set.

19. The computer program transmission medium of claim 18 where the computer process prior to the step of detecting the application token further comprises the steps of:

detecting a warning token in the ITV signal; and in response to detection of the warning token, initiating the downloading of the ITV application to the set top computing system.

20. The computer program transmission medium of claim 19 where said computer process in the computer program further comprises the step of:

synchronizing said executing step with completion of the termination of the running of the current video program by the terminating step so that execution of the ITV application begins immediately upon completion of the termination of the current video program.

21. The computer program storage medium of claim 18 where said computer process in the computer program further comprises the step of:

synchronizing said executing step with completion of the termination of the running of the current video program by the terminating step so that execution of the ITV application begins immediately upon completion of the termination of the current video program.

22. The computer program transmission medium of claim 18 where, in the computer program, the computer process step of executing further comprises the steps of:

displaying on the television set a plurality of choices to a user of the set top computing system;

launching a selected application in response to a choice by the user;

executing the selected application in the set top computing system and storing a current context as an origination reference back to the ITV application from the selected application;

interacting the selected application with the user;

detecting a quit response from the user; and in response to a quit response, launching the current context stored by said storing step to return the set top computing system to the origination reference in the ITV application from which the selected application was launched.

23. The computer program transmission medium of claim 22 where, in the computer program, the computer process step of launching comprises the steps of:

context detecting whether the current context includes one or more of a television channel number and an application name;

in response to said context detecting step detecting a channel number, tuning to a channel identified by the channel number; and     in response to said context detecting step detecting an application name, executing an application identified by the application name.

\* \* \* \* \*